F. Rudolph,

Latch.

No. 2,222. Reissued Apr. 10, 1866.

Witnesses:

M. M. Livingston

Wm. Greenwood

Inventor:

Fred Rudolph

AM. PHOTO-LITHO. CO. N.Y. (OSBORNE'S PROCESS.)

UNITED STATES PATENT OFFICE.

RUDOLPH VOLLSCHWITZ AND J. J. SCHLAEPFER, OF NEW YORK, N. Y., ASSIGNEES, BY MESNE ASSIGNMENTS, OF F. RUDOLPH.

IMPROVEMENT IN LOCKS.

Specification forming part of Letters Patent No. 48,980, dated July 25, 1865; Reissue No. 2,222, dated April 10, 1866.

*To all whom it may concern:*

Be it known that FREDERICK RUDOLPH did invent a new and Improved Lock, for which Letters Patent were granted July 25, 1865; and we, RUDOLPH VOLLSCHWITZ and J. J. SCHLAEPFER, of the city, county, and State of New York, assignees of said FRED. RUDOLPH, do hereby declare that the following is a full, clear, and exact description thereof, which will enable those skilled in the art to make and use the same, reference being had to the accompanying drawings, forming part of this specification, in which—

Figure 2:
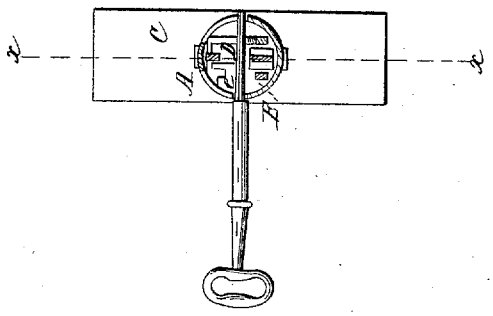
Figure 1:
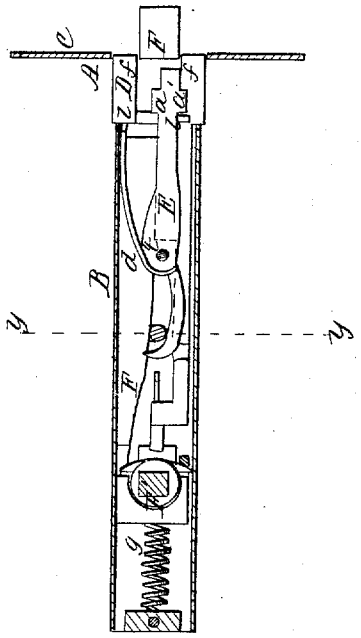

Figure 1 represents a longitudinal central section of this invention, the line *x x*, Fig. 2, indicating the plane of section. Fig. 2 is a transverse vertical section of the same, taken in the plane indicated by the line *y y*, Fig. 1.

Similar letters of reference indicate like parts.

This invention relates to a lock in which the bolt, together with one or more tumblers, and with or without a latch, is inclosed in a tubular case, which can be inserted in a door by boring or otherwise forming a hole therein large enough to take said case. Said case is made in two halves, which, when fitted together, form a tube. The latch is so arranged that it operates in a slot in the head of the bolt; or it may be made to work side by side with said bolt, said latch being operated by a handle and the bolt by a key in the usual manner.

A represents a lock, the working parts of which are inclosed in a cylindrical case, B, which is secured to the front plate, C, by rivets or any other suitable means. The working parts of the lock are composed of a bolt, D, which is held in position, when drawn in or pushed out, by a tumbler, E, the head of which is provided with two shoulders, *a a'*, which catch either in front or behind pins *b*, projecting from the head of the bolt, as clearly shown in Fig. 1 of the drawings. The tumbler oscillates on a pivot, *c*, and it is subjected to the action of a spring, *d*, which has a tendency to keep its head in contact with the pin *b*. When the key K is inserted into the lock and turned, the bit *e* depresses the shank of the tumbler, thereby raising the head of the same clear of the pin *b*, and at the same time it acts on the bolt D, pushing the same in or out, according to the direction in which the key is turned and to the position of the bolt. In the drawings two tumblers are shown, one on either side of the bolt, and the shank of the bolt is so formed that it is acted upon by the bit of the key from whatever side said key may be inserted.

The head of the bolt is provided with a slot, *f*, in which the head of the latch F works. This latch is of the ordinary shape, and its shank extends back in the case and is exposed to the action of a spring, *g*, which has a tendency to throw the same out to the position shown in the drawings.

F' is the nut, which is constructed in the ordinary way, with a square hole to receive the stem to which the handles are secured, and with two wings which bear on shoulders at the end of the shank of the latch, so that by turning the handle in either direction the latch is forced qack against the action of the spring *g*.

It must be remarked that instead of placing the head of the latch in a slot in the head of the bolt it might be arranged side by side with the same without changing the internal construction of the lock.

We claim as new and desire to secure by Letters Patent—

1. A lock with a tubular case, B, containing a bolt, D, and one or more tumblers, E, to be operated from either side by a key, K, substantially as and for the purpose set forth.

2. The latch F, in combination with the bolt D and tubular case B, constructed and operating substantially as and for the purpose described.

RUDOLPH VOLLSCHWITZ.
J. J. SCHLAEPFER.

Witnesses:
M. M. LIVINGSTON,
C. L. TOPLIFF.